(12) United States Patent
Qiu

(10) Patent No.: US 12,504,619 B2
(45) Date of Patent: Dec. 23, 2025

(54) TELESCOPE, AND ELECTRONIC EYEPIECE AND EYEPIECE ADAPTER FOR THE SAME

(71) Applicant: LIGHT SPEED VISION (BEIJING) CO., LTD, Beijing (CN)

(72) Inventor: Hongyun Qiu, Beijing (CN)

(73) Assignee: LIGHT SPEED VISION (BEIJING) CO., LTD., Beijing (CN)

( * ) Notice: Subject to any disclaimer, the term of this patent is extended or adjusted under 35 U.S.C. 154(b) by 338 days.

(21) Appl. No.: 18/264,839

(22) PCT Filed: Jan. 24, 2022

(86) PCT No.: PCT/CN2022/073444
§ 371 (c)(1),
(2) Date: Aug. 9, 2023

(87) PCT Pub. No.: WO2022/170950
PCT Pub. Date: Aug. 18, 2022

(65) Prior Publication Data
US 2024/0118532 A1    Apr. 11, 2024

(30) Foreign Application Priority Data

Feb. 10, 2021    (CN) .......................... 202110185328.5

(51) Int. Cl.
G02B 25/00    (2006.01)
G02B 23/04    (2006.01)
G02B 23/12    (2006.01)

(52) U.S. Cl.
CPC ........... *G02B 25/001* (2013.01); *G02B 23/04* (2013.01); *G02B 23/12* (2013.01)

(58) Field of Classification Search
None
See application file for complete search history.

(56) References Cited

U.S. PATENT DOCUMENTS 5,579,165 A * 11/1996 Michel ...................... F41G 3/02
359/410
7,483,213 B2 * 1/2009 Pochapsky ............. G03B 33/12
353/69
7,911,687 B2 * 3/2011 Scholz ................... H04N 23/20
359/399

FOREIGN PATENT DOCUMENTS

CN    102607407 A    7/2012
CN    103837461 A    6/2014
(Continued)

OTHER PUBLICATIONS

International Search Report issued in corresponding International Application No. PCT/CN2022/073444, dated Apr. 13, 2022, pp. 1-5, CNIPA, Beijing, China.

*Primary Examiner* — Jyotsna V Dabbi
(74) *Attorney, Agent, or Firm* — HAUPTMAN HAM, LLP

(57) ABSTRACT

A telescope, including a microdisplay, a beam combiner, a dichroitic beam splitter, and an image sensor. The beam combiner receives light from an objective lens and the microdisplay, and mixes same. The dichroitic beam splitter allows at least part of invisible light and a small part of visible light having a predetermined wavelength to enter a second optical path leading to the image sensor. The image sensor obtains a detection image representing an optical image formed by the objective lens and an electronic image displayed on the microdisplay. Also disclosed are an electronic eyepiece and an eyepiece adapter for the telescope. The detection image representing the optical image and the electronic image can be obtained.

20 Claims, 7 Drawing Sheets

(56) References Cited

FOREIGN PATENT DOCUMENTS

| CN | 107065188 | A | 8/2017 |
| CN | 108459408 | A | 8/2018 |
| JP | 2009258212 | A | 11/2009 |

* cited by examiner

TELESCOPE, AND ELECTRONIC EYEPIECE AND EYEPIECE ADAPTER FOR THE SAME

The present application is a National Phase of International Application Number PCT/CN2022/073444, filed Jan. 24, 2022, which claims priority to Chinese Application No. 202110185328.5, filed Feb. 10, 2021.

TECHNICAL FIELD

The present disclosure relates to the technical field of telescope, in particular to a telescope, and electronic eyepiece and eyepiece adapter for telescope.

BACKGROUND

A telescope is an optical instrument that utilizes lenses or concave mirrors and other optical devices to observe distant objects. When observing with a telescope, light rays from a distant object are refracted by a lens or reflected by a concave mirror, converged into an image, and then seen through an eyepiece with a certain magnification.

In recent years, people have started to introduce, for example, Augmented Reality (AR) displays and Mixed Reality (MR) displays on the telescope, in which an optical image obtained through the telescope objective lens is mixed with, for example, an electronic image displayed on a monitor in the same optical path, and finally, for example, it can be presented to an observer through the eyepiece together. The registration/alignment of the electronic image with the optical image has a significant impact on the quality of the augmented reality and mixed reality display, which however has not yet been addressed in the prior art.

SUMMARY

The object of the present disclosure is to provide a telescope and an electronic eyepiece and an eyepiece adapter for the same, so as to at least partly overcome the deficiencies in the prior art.

According to one aspect of the present disclosure, a telescope is provided, which comprises a lens barrel and an objective lens housed within the lens barrel, the objective lens being used to form an optical image of an object observed with the telescope, the lens barrel being provided with an eyepiece interface, wherein the telescope further comprises:
  a microdisplay for displaying an electronic image;
  a beam combiner which receives light from the objective lens and light from the microdisplay and mixes them so that the optical image formed by the objective lens and the electronic image displayed on the microdisplay can spatially overlap and thus be observed together;
  a dichroic beam splitter which receives light mixed by the beam combiner, and selectively reflects and transmits it according to wavelength, allowing most of the visible light to enter a first optical path leading to the eyepiece interface and allowing at least part of invisible light and a small part of visible light of a predetermined wavelength to enter a second optical path; and
  an image sensor, provided in the second optical path, which receives the invisible light from the dichroic beam splitter and the visible light of the predetermined wavelength to obtain a detection image representing the optical image formed by the objective lens and the electronic image displayed on the microdisplay.

According to another aspect of the present disclosure, an electronic eyepiece for a telescope is provided, which comprises a housing, the housing being provided with an objective-connecting end interface for connecting to a telescope barrel at one end and an optical eyepiece at the other end, wherein the electronic eyepiece further comprises:
  a microdisplay for displaying an electronic image;
  a beam combiner which receives light from an objective lens and light from the microdisplay and mixes them so that the optical image formed by the objective lens of the telescope and the electronic image displayed on the microdisplay can spatially overlap and thus be observed together;
  a dichroic beam splitter which receives light mixed by the beam combiner, and selectively reflects and transmits it according to wavelength, allowing most of visible light to enter a first optical path leading to the optical eyepiece and at least part of invisible light and a small part of the visible light of a predetermined wavelength to enter a second optical path; and
  an image sensor, provided in the second optical path, which receives the invisible light from the dichroic beam splitter and the visible light of the predetermined wavelength to obtain a detection image representing the optical image formed by the objective lens of the telescope and the electronic image displayed on the microdisplay.

According to yet another aspect of the present disclosure, an eyepiece adapter for a telescope, comprising a housing, the housing being provided with a objective-connecting interface for connecting to a telescope barrel at one end and an eyepiece interface for mounting an eyepiece at the other end, wherein the eyepiece adapter further comprises:
  a microdisplay for displaying an electronic image;
  a beam combiner which receives light from an objective lens and light from the microdisplay and mixes them so that the optical image formed by the objective lens of the telescope and the electronic image displayed on the microdisplay can spatially overlap and thus be observed together;
  a dichroic beam splitter which receives light mixed by the beam combiner, and selectively reflects and transmits it according to wavelength, allowing most of visible light to enter a first optical path leading to the eyepiece interface and at least part of invisible light and a small part of visible light of a predetermined wavelength to enter a second optical path; and
  an image sensor, provided in the second optical path, which receives the invisible light from the dichroic beam splitter and the visible light of the predetermined wavelength to obtain a detection image representing the optical image formed by the objective lens of the telescope and the electronic image displayed on the microdisplay.

According to yet another aspect of the present disclosure, a telescope comprising a lens barrel, an objective lens provided within the lens barrel, and an electronic eyepiece or an eyepiece adapter as set forth above and mounted on the lens barrel.

According to embodiments of the present invention, a detection image representing the optical image formed by the objective lens of the telescope and the electronic image displayed on the microdisplay can be obtained, by providing a dichroic beam splitter and an image sensor in the optical path in which the optical image from the objective lens and the electronic image from the microdisplay are mixed, allowing at least part of the invisible light and a small part of the visible light of the predetermined wavelength from the optical path leading to the eyepiece/eyepiece interface, and obtaining images corresponding to these lights. Thus, registration information of the optical image and the electronic image can be obtained, thereby solving the problem of registration between the electronic image and the optical image.

BRIEF DESCRIPTION OF THE DRAWINGS

Other features, objects and advantages of the present disclosure will become more apparent by reading detailed description of non-limiting embodiments with reference to following figures.

DETAILED DESCRIPTION

In the following detailed description, embodiments are described in sufficient details to enable those skilled in the art to practice the invention. It is to be understood that other embodiments may be utilized without departing from the scope of the invention. The following detailed description is, therefore, not to be taken in a limiting sense.

It is to be noted that the embodiments and the features in the embodiments in the present application may be combined with each other without conflict. The present invention will be described in detail below with reference to the accompanying drawings and in connection with the embodiments.

Figure 1:
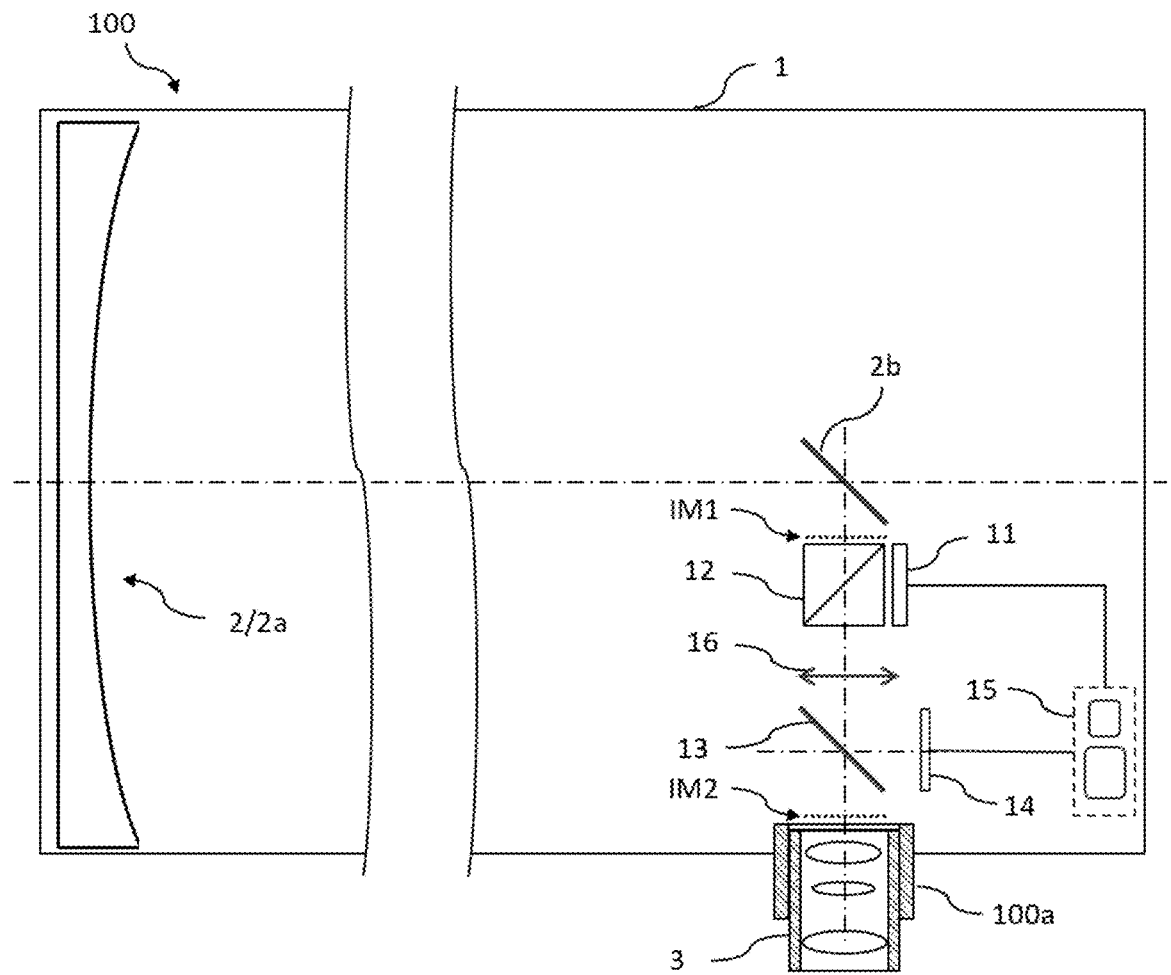
FIG. 1 is a schematic diagram of a structure of a telescope according to embodiment one of the present disclosure.

First, a telescope 100 according to Embodiment One of the present invention is described with reference to FIG. 1. FIG. 1 shows a schematic diagram of the structure of the telescope 100. As shown in FIG. 1, the telescope 100 comprises a lens barrel 1 and an objective lens 2 housed in the lens barrel 1, the objective lens 2 is used to form an optical image (e.g., imaged on the image plane IM1 shown in FIG. 1) of an object (e.g., a constellation, a nebula, and other celestial objects) observed with the telescope 100, and the barrel 1 is provided with an eyepiece interface 100a for connecting a telescope eyepiece 3. As an example only, the telescope illustrated in FIG. 1 is a Newtonian reflecting telescope, wherein the objective lens 2 comprises a primary mirror 2a comprising a concave reflector and a secondary mirror 2b comprising a retroreflector. It should be understood, however, that the present invention is not limited to a particular type of telescope, and that telescopes according to embodiments of the present invention can also have an objective lens comprising a lens, or can instead be other types of reflecting telescopes.

According to this embodiment, the telescope 100 further comprises a microdisplay 11, a beam combiner 12, a dichroic beam splitter 13 and an image sensor 14.

The microdisplay 11 is used to display an electronic image. For example, an LCD display, an OLED display, etc. can be used as the microdisplay 11. According to embodiments of the present invention, the microdisplay 11 is preferably constituted by an OLED display. This is because that the image displayed on the microdisplay 11 is to be displayed mixed with an optical image formed by the (telescope) objective lens 2, the optical image formed by the objective lens 2 is usually of low brightness, and the OLED display has better stray light suppression performance than, for example, an LCD display, and can provide a darker display background, thus facilitating the realization of better augmented reality or mixed reality display effects.

As shown in FIG. 1, the beam combiner 12 receives light from the objective lens 2 and light from the microdisplay 11, and mixes them by transmitting and reflecting them respectively (and vice versa), so that the optical image formed by the objective lens 2 and the electronic image displayed on the microdisplay can spatially overlap and thus be observed together. The beam combiner 12 is preferably a beam-splitting prism, on one side of which the microdisplay 11 is provided. In some embodiments, the microdisplay 11 can be affixed to the side of a light merging prism 12 for simple and reliable mounting.

According to embodiments of the present invention, a dichroic beam splitter 13 and an image sensor 14 are provided in the telescope 100, which are provided downstream of the beam combiner 12 along the optical path. The dichroic beam splitter 13 receives light mixed by the beam combiner 12, and selectively reflects and transmits it according to the wavelength so that most of the visible light enters the first optical path leading to the eyepiece interface 100a, while at least a part of the invisible light and a small portion/small part of the visible light of a predetermined wavelength enters the second optical path leading to the image sensor 14. Here, it should be understood that "a small portion/small part" is relative to "a large part" and is also determinable by a person skilled in the art based on the minimum requirement of the image sensor 14 for the part of light.

The image sensor 14 receives invisible light and visible light of a predetermined wavelength from the dichroic beam splitter 13 to acquire a detection image representing an optical image formed by the objective lens 2 and an electronic image displayed on the microdisplay 11.

The inventors of the present invention have taken into account that: spectrally, the optical image from the objective lens 2 contains a continuous spectrum from invisible light to visible light, whereas the spectra of display devices, such as LCD displays and OLED displays which can be used to form microdisplay 11, basically contain only visible light. Therefore the invisible light separated by the dichroic beam splitter 13 can be used to form an image which represents the optical image from the objective lens 2 only; while selectively splitting out a small part of visible light can be used to form an image containing both information from the optical image of the objective lens 2 and information from the electronic image displayed on the microdisplay 11 while minimizing the effect on the optical image formed by the objective lens 2. Based on the above considerations, the above-described light-splitting design is proposed in accordance with the embodiment of the present invention, which makes it possible to obtain, based on the image detection by the image sensor 14, information about the registration of the optical image formed by the objective lens 2 and the electronic image displayed on the microdisplay 11 when they are mixed and displayed together.

The at least part of the invisible light separated by the dichroic beam splitter 13 is preferably infrared light. The visible light of a predetermined wavelength separated by the dichroic beam splitter 13 is preferably visible light of a single wavelength band, which can be, for example, blue, green or red light.

In some embodiments, the predetermined wavelength of visible light is preferably red light, preferably at a wavelength greater than or equal to 690 nm, and more preferably at a wavelength greater than or equal to 730 nm. The dichroic beam splitter 13 allows a large part of red light of the predetermined wavelength to enter a first optical path leading to the eyepiece interface 100a, and allows a small part of red light of the predetermined wavelength to enter a second optical path leading to the image sensor 14. From the viewpoint of the formation process of the beam splitter film of the dichroic beam splitter 13, the wavelengths of the red light and the infrared light are adjacent to each other, and it is possible to constitute the dichroic beam splitter 13 by forming a beam splitter film having a single passband covering the wavelengths of the red light and the infrared light, which is conducive to simplifying the design and manufacture of the dichroic beam splitter 13, and is conducive to ensuring a beam splitting effect and improving the display quality of the telescope.

In other embodiments, the predetermined wavelength of visible light is preferably green light. The dichroic beam splitter 13 allows most of the green light to enter the first optical path leading to the eyepiece interface 100a, while allowing a small portion/small part of green light to enter the second optical path leading to the image sensor 14. The inventors of the present invention have found through tests that, in the case of splitting out the green light, the optical image formed by the objective lens 2 observed through the eyepiece performs better in terms of color balance.

According to embodiments of the present invention, as shown in FIG. 1, the telescope 100 can further comprise a controller 15. The controller 15 calculates, based on the images detection by the image sensor 14, to obtain registration information about the registration of the optical image from the objective lens 2 and the electronic image from the microdisplay 11 after mixed by the beam combiner 12. The controller 15 can, for example, include a memory and a processor and other circuitry or mechanisms that support its function.

Figure 2:
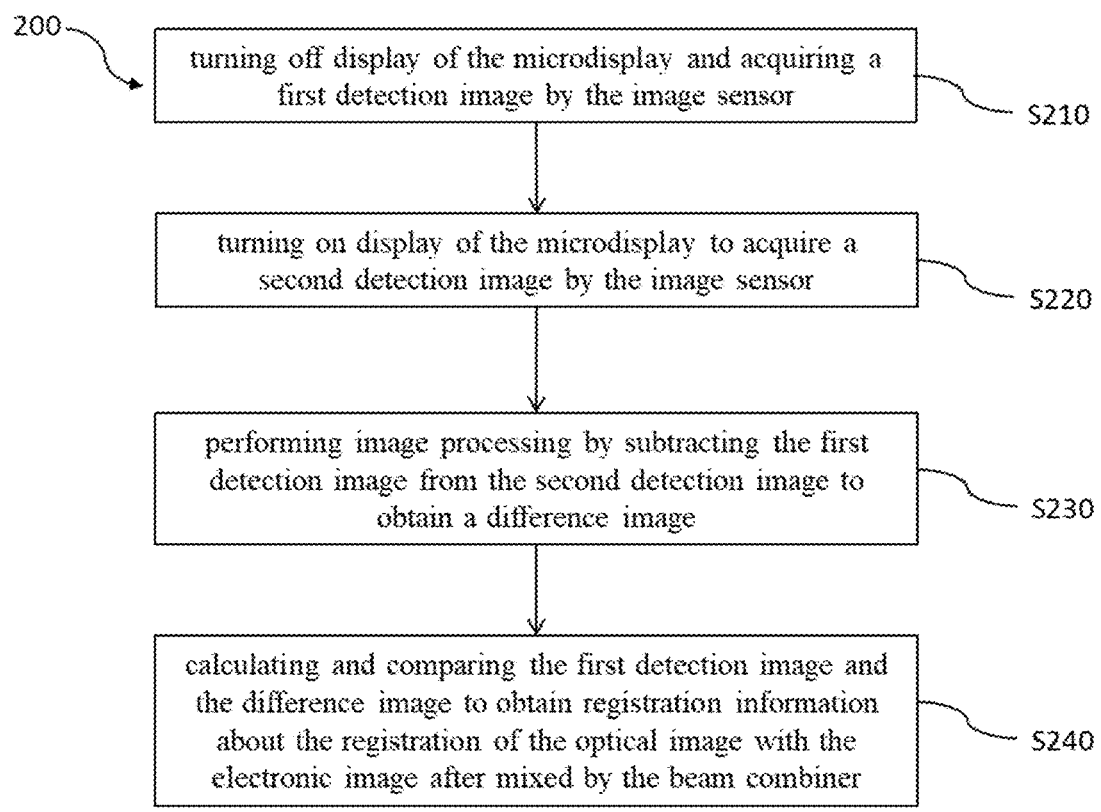
FIG. 2 is a flowchart of a control method that can be used in embodiments of the present disclosure.
Figure 3:
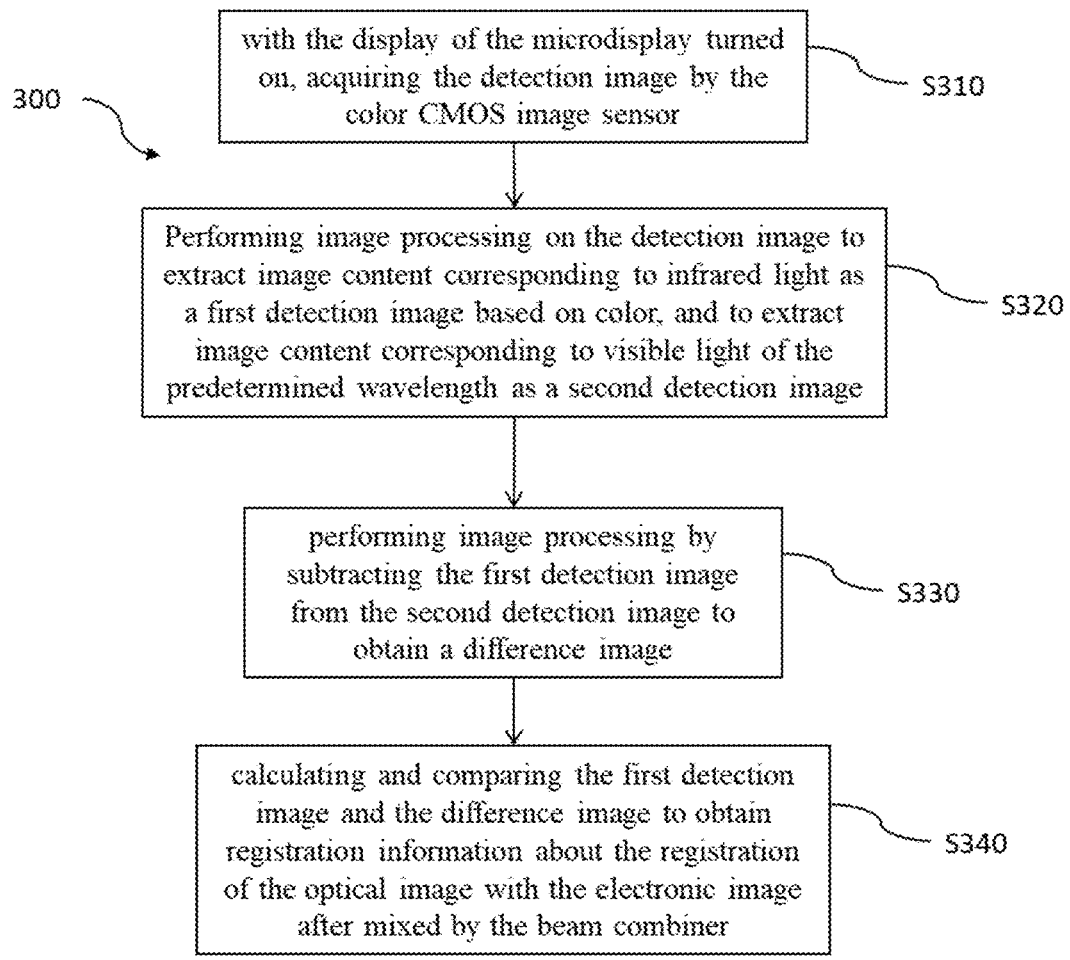
FIG. 3 is a flowchart of another control method that can be used in embodiments of the present disclosure.

FIGS. 2 and 3 illustrate, respectively, flowcharts of two different control methods that can be used in embodiments of the present invention for image registration based on beam splitting by a dichroic beam splitter 13 and an image detection by an image sensor 14.

In the case where the image sensor 14 is a black and white sensor, the controller 15 can use the control method 200 shown in FIG. 2. As shown in FIG. 2, the control method 200 includes the following processing:

S210: turning off display of the microdisplay and acquiring a first detection image by the image sensor;

S220: turning on the display of the microdisplay to acquire a second detection image by the image sensor;

S230: performing image processing by subtracting the first detection image from the second detection image to obtain a difference image; and S240: calculating and comparing the first detection image and the difference image to obtain a registration information about the registration of the optical image with the electronic image after mixed by the beam combiner.

In the processing S210, after the display of the microdisplay 11 is turned off, the first detection image acquired by the image sensor 14 contains only information of the optical image formed by the objective lens 2. "Turning off display of the microdisplay" can be realized here either by directly turning off the microdisplay 11, by controlling the microdisplay 11 to display a purely black image, or by utilizing, for example, a light-shielding mechanism (not shown) to shield the light that enters the beam combiner 12 from the microdisplay 11. Accordingly, "turning on the display of the microdisplay" in process 220 is not limited to a specific realization method, and will not be repeated here. In process S210

In processing S220, after the display of the microdisplay is turned on, the second detection image acquired by the image sensor 14 contains both information of the optical image formed by the objective lens 2 and information of the electronic image displayed on the microdisplay 11.

Next, in the processing S230, performing image processing on the first detection image and the second detection image so that a difference image representing the electronic image displayed on the microdisplay 11 can be obtained by subtracting the first detection image containing only optical image information from the second detection image containing both optical image and electronic image information.

Then, in the processing S240, by comparing the first detection image and the difference image, information can be obtained as to whether the optical image is registered with the electronic image after mixing via the beam combiner 12.

In the case where the image sensor 14 is a color CMOS image sensor, the controller 15 can use the control method 300 shown in FIG. 3. As shown in FIG. 3, the control method 300 includes the following processing:

S310: with display of the microdisplay turned on, acquiring the detection image by the color CMOS image sensor;

S320: performing image processing on the detection image to extract image content corresponding to infrared light as a first detection image based on color, and to extract image content corresponding to visible light of the predetermined wavelength as a second detection image;

S330: performing image processing by subtracting the first detection image from the second detection image to obtain a difference image; and S340: calculating and comparing the first detection image and the difference image to obtain a registration information about the registration of the optical image with the electronic image after mixed by the beam combiner.

It can be seen that the processing S330, S340 of the control method 300 is the same as the processing S230, S240 of the control method 200, with the difference being that the way of acquiring the first detection image and the second detection image in the control method 300 is different from that of the control method 200: in the control method 200, in order to acquire the first detection image and the second detection image, it is necessary to control the microdisplay 11 to be on and off and the images are acquired in two separate passes; whereas, in the control method 300, a single image acquisition is performed in the processing S310 using a color CMOS image sensor, and then the first detection image and the second detection image are acquired by image processing in the processing S320.

The control method 300 is implemented based on a color CMOS image sensor. Since the color CMOS sensor is capable of sensing not only visible light of different wavelengths to obtain images of corresponding colors, but also infrared light, and the image corresponding to the infrared light is white, it can be distinguished from the image corresponding to the visible light having corresponding colors. Thus, information corresponding to light of different wavelengths in the image acquired in the processing S310 can be extracted separately according to the color. As described above, image content corresponding to infrared light, for example, white color, can be extracted as the first detection image in the processing S320, and since the infrared light comes from an optical image formed by the objective lens 2 and the spectrum of the electronic image of the microdisplay 11 does not contain infrared light, the first detection image represents an optical image formed by the objective lens 2. Meanwhile, in the processing S320, image content corresponding to visible light of a predetermined wavelength, such as green color, can be extracted as a second detection image, and since both the optical image formed by the objective lens 2 and the electronic image displayed on the microdisplay 11 contain green light in their spectra, the second detection image represents both the optical image and the electronic image.

Next, in the processing S330, similar to the processing S230 of the control method 200, the first detection image is subtracted from the second detection image to obtain a difference image, which represents an electronic image of the microdisplay 11.

Then, in the processing S340, by comparing the first detection image and the difference image, information can be obtained as to whether the optical image and the electronic image are in register after mixed via the beam combiner 12.

Figure 4:
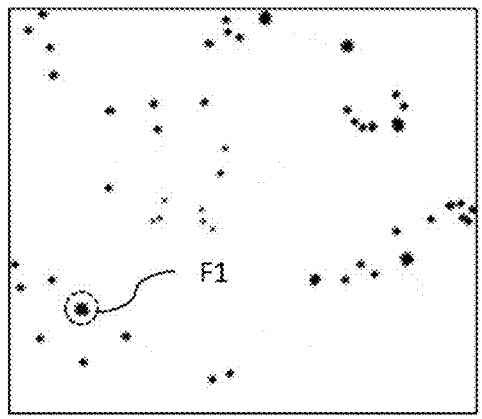
FIG. 4 schematically illustrates a first detection image, a second detection image and a difference image obtained using the control method shown in FIG. 2 or FIG. 3.
Figure 4:
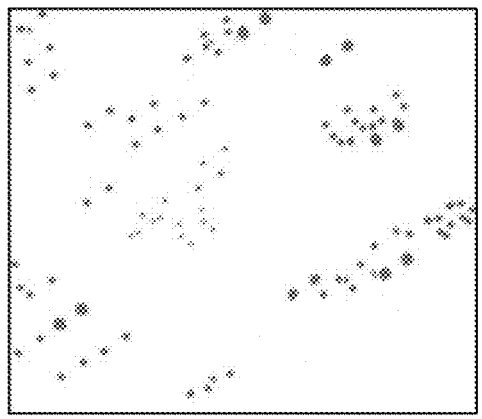
Figure 4:
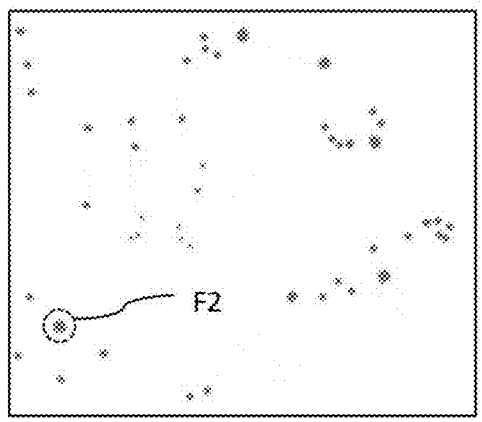
Figure 4:
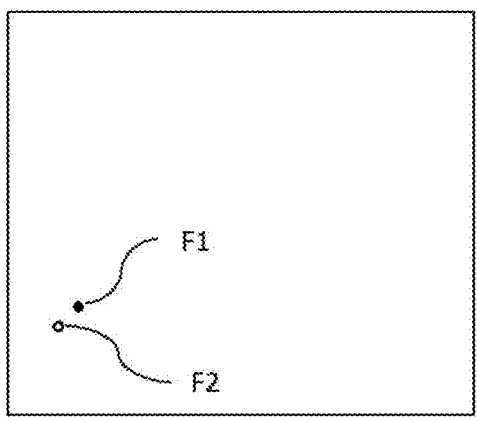

For ease of understanding and as an example only, FIG. 4 schematically illustrates a first detection image, a second detection image, and a difference image obtained using the control method shown in FIG. 2 or FIG. 3 (the images are all shown herein as grayscale images on a white background). In FIG. 4, image (a) shows an example of the first detection image (excluding the labeling information of the feature F1), in which a plurality of star dots are shown; image (b) shows an example of the second detection image (excluding the labeling information of the feature F2), in which it can be seen that the second detection image contains a greater number of star dots as compared to the first detection image, and that many of the star dots are obviously resulted from misregistration of the "ghosting" effect; image (c) is the difference image obtained by subtracting the first detection image from the second detection image; and picture (d) schematically shows an example in which the first detection image and the difference image are compared to obtain the registration information, i.e., to find the corresponding feature (e.g., the same star point) F1 in the first detection image and the difference image, F2, and the positions of the features F1 and F2 are compared so as to obtain a positional deviation between the first detection image and the difference image, thereby obtaining registration information between the optical image and the electronic image.

It should be understood that in order to obtain registration information, when performing the control method 200 or 300, the electronic image displayed on the microdisplay 11 is an image that is expected to have a registration relationship with the optical image from the objective lens 2. By way of example only, the electronic image can be an image of the optical image captured by the image sensor 14, or can be an image obtained after the image of the optical image has been subjected to image processing (e.g., noise reduction and brightness enhancement). The control methods 200, 300 can be performed during the process of calibrating the telescope, or can be performed during the process of observing using the telescope, depending on the needs of the augmented or mixed reality display to be realized by the telescope.

Preferably, according to embodiments of the present invention, the controller 15 is further configured to control, based on the above acquired registration information, such that the optical image from the objective lens 2 and the electronic image from the microdisplay 11 are registered with each other. Preferably, the controller 15 can correct the electronic image displayed on the microdisplay 11 to achieve the registration. Of course, it should be understood that the controller 15 can also control, for example, positions of the microdisplay 11, the beam combiner or other elements so as to adjust the registration, and the present invention is not limited in this respect.

In addition, according to embodiments of the present invention, the controller 15 can also be configured to perform the following processing:
 (a) based on the first detection image, solving astronomical coordinates of orientation of the telescope; and
 (b) generating an electronic image based on the astronomical coordinates for combining with the optical image to provide an augmented or mixed reality display, and controlling the microdisplay 11 to display the electronic image.

In processing (a), information such as star points contained in the optical image formed through the objective lens 2 of the telescope can be recognized and extracted from the first detection image, and then the astronomical coordinates of orientation of the telescope can be directly solved based on the plurality of star points by star point recognition (also known as star map recognition).

In processing (b), the astronomical coordinates are used to generate an electronic image that is combined with the optical image to provide an augmented or mixed reality display. For example, based on the astronomical coordinates of the orientation of the telescope, it is possible to obtain information about a celestial region or a celestial body and to form an electronic image comprising information describing the celestial region or the celestial body.

Returning to the reference to FIG. 1, preferably, the telescope 100 can also include a relay lens 16 provided in the optical path between the beam combiner 12 and the eyepiece interface 100*a* for relay-imaging the optical image formed by the objective lens 2 and the electronic image displayed on the microdisplay 11 onto the target image plane IM2 in the vicinity of the eyepiece interface 100*a*. In the example shown in FIG. 1, the relay lens 16 is provided between the beam combiner 12 and the dichroic beam splitter 13, but the present invention is not limited thereto.

Figure 5:
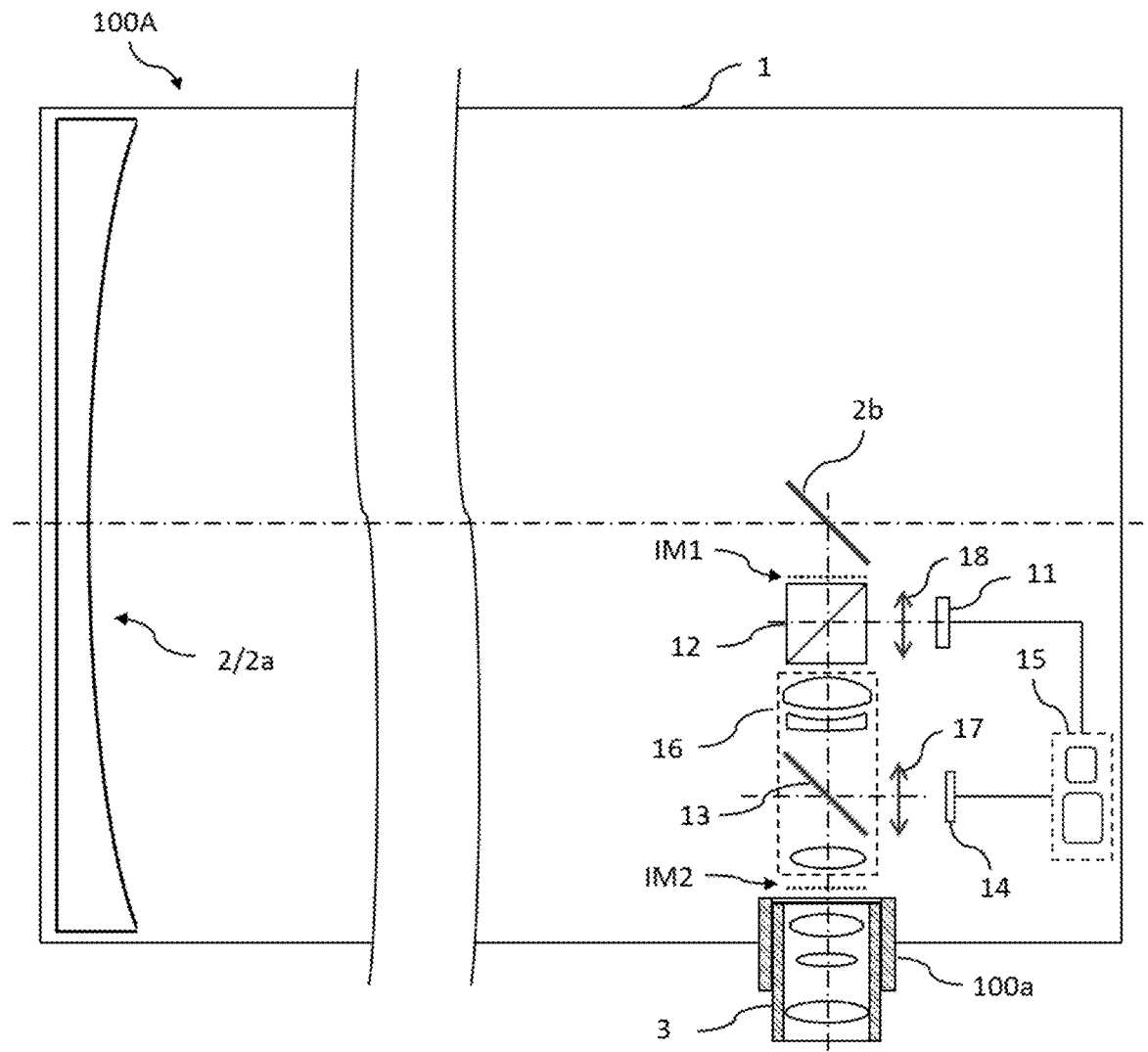
FIG. 5 shows a schematic structure of a telescope according to Embodiment Two of the present disclosure.

FIG. 5 shows a schematic diagram of the structure of the telescope 100A according to Embodiment Two of the present invention. The telescope 100A according to Embodiment Two of the present invention has substantially the same structure as the telescope 100 according to Embodiment One of the present invention, and difference lies mainly in that the relay lens 16 of the telescope 100A comprises a plurality of lenses, and the dichroic beam splitter 13 is provided between two of the lenses of the plurality of lenses of the relay lens 16. This provision of the telescope 100A facilitates the realization of a more compact optical system.

In addition, as shown in FIG. 5, a first adapted lens group 17 for the image sensor 14 and/or a second adapted lens group 18 for the microdisplay 11 can also be included in the telescope 100A. The first adapted lens group 17 is primarily used to adjust the size of a real image being imaged onto a sensing surface of the image sensor 14 to fit the size of the sensing surface of the image sensor 14. Similarly, the second adapting lens group 18 is primarily used to adjust the size of the electronic image mixed with the optical image from the objective lens by imaging the electronic image displayed on the microdisplay 11 such that the electronic image can match the size of the optical image. The setting of the first adapted lens group 17 and the second adapted lens group 18 enables greater flexibility in the selection of the image sensor 14 and the microdisplay 11, which is conducive to cost reduction.

Figure 6:
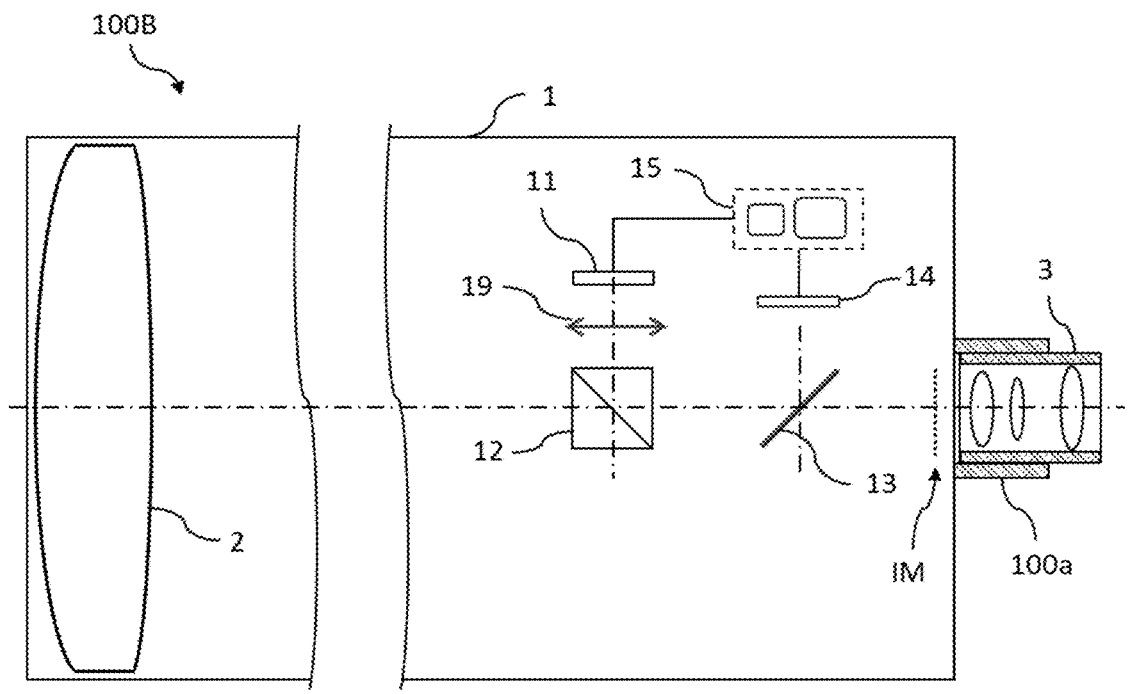
FIG. 6 shows a schematic structure of a telescope according to Embodiment Three of the present disclosure.

FIG. 6 shows a schematic diagram of the structure of the telescope 100B according to Embodiment Three of the present invention. As shown in FIG. 6, the telescope 100B comprises a barrel 1 and an objective lens 2 housed in the barrel 1. The objective lens 2 is used to form an optical image of an object observed with the telescope 100B, and the barrel 1 is provided with an eyepiece interface 100a for connecting to an eyepiece 3. In the example shown in FIG. 6, the objective lens 2 comprises a lens.

Same as the telescope 100 and the telescope 100A, the telescope 100B further comprises a microdisplay 11, a beam combiner 12, a dichroic beam splitter 13, and an image sensor 14, wherein: the microdisplay 11 is used for displaying an electronic image; the beam combiner 12 receives light from the objective mirror 2 and light from the microdisplay 11 and mixes them, such that an optical image formed by the objective mirror 2 and the electronic image displayed on the microdisplay 11 can spatially overlap and thus be observed together; a dichroic beam splitter 13 receives the light mixed by the beam combiner 2 and selectively reflects and transmits it according to the wavelength so that most of the visible light enters the first optical path leading to the eyepiece interface 100a and at least part of the invisible light and a small part of the visible light of a predetermined wavelength enter the second optical path leading to the image sensor 14; and the image sensor 14 receives the invisible light and the visible light of the predetermined wavelength to obtain a detection image representative of the optical image formed by the objective lens 2 and the electronic image displayed on the microdisplay 11. The telescope 100B can also comprise a controller 15 for realizing, for example, the same control methods as well as control processing as described above in conjunction with Embodiment One, which will not be repeated herein.

The telescope 100B according to this embodiment differs from the telescope 100 according to Embodiment One and the telescope 100A according to Embodiment Two mainly in that a relay lens 16 provided between the beam combiner 12 and the eyepiece interface 100a is not included in the telescope 100B. The telescope 100B can include a projection lens 19 provided between the microdisplay 11 and the beam combiner 12, for projecting an electronic image displayed on the microdisplay 11 onto a target image plane IM near the eyepiece interface 100a. The optical image formed by the objective lens 2 is ultimately imaged on this target image plane IM as well.

Figure 7:
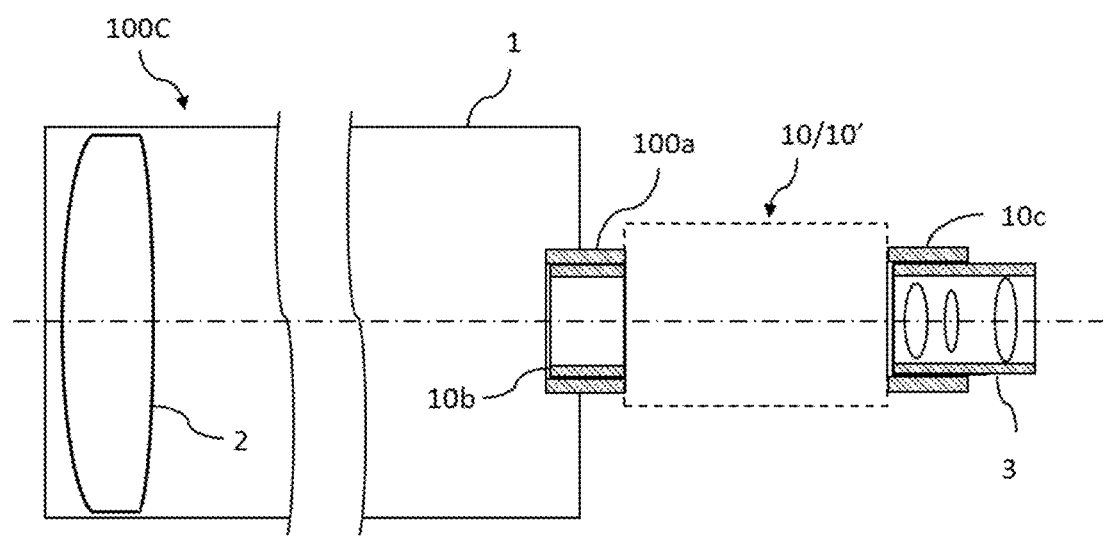
FIG. 7 shows a schematic structural diagram of a telescope according to Embodiment Four of the present disclosure.

In the above-described telescope according to embodiments of the present invention, elements such as a beam combiner and a dichroic beam splitter, are provided in the telescope barrel, but the present invention is not limited thereto. In particular, when an existing telescope is modified, it is preferred to provide an augmented reality and/or mixed reality display function and an image registration function by means of an electronic eyepiece or eyepiece adapter according to embodiments of the present invention. For example, as schematically illustrated in FIG. 7, the telescope 100C according to Embodiment Four of the present invention comprises a lens barrel 1, an objective lens 2 disposed within the lens barrel 1, and an electronic eyepiece 10 or eyepiece adapter 10' according to embodiments of the present invention mounted on the lens barrel 1.

Figure 8:
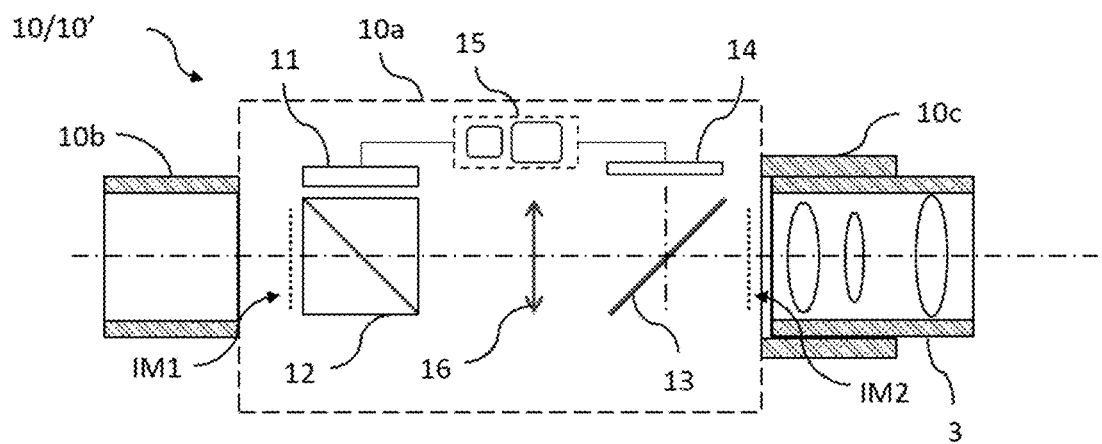
FIG. 8 shows a schematic structure of an electronic eyepiece and eyepiece adapter according to embodiments of the present disclosure.

FIG. 8 shows a schematic diagram of the structure of an electronic eyepiece and an eyepiece adapter according to embodiments of the present invention. In the present application, the electronic eyepiece refers to a telescope eyepiece device incorporating an optical eyepiece, which is detachably combined with the telescope barrel through an interface, and the eyepiece adapter refers to an adapter device capable of being detachably combined with the telescope barrel and the optical eyepiece through an objective-connecting interface and an eyepiece interface, respectively.

As shown in FIG. 8, the eyepiece adapter 10' according to embodiments of the present invention comprises a housing 10a, the housing 10a is provided at one end with an objective-connecting interface 10b for connecting to the telescope barrel 1, and at the other end an eyepiece interface 10c for mounting an optical eyepiece 3.

The electronic eyepiece 10 according to embodiments of the present invention can be constituted by the eyepiece adapter 10' combined with the optical eyepiece 3 via the eyepiece interface 10c, or it can be constituted by removing the eyepiece interface 10c from the structure of the eyepiece adapter 10' and fixedly connecting the optical eyepiece 3. In short, the electronic eyepiece 10 comprises a housing 10a provided at one end of the housing 10a with an objective-connecting interface 10b for connection to a telescope barrel, and an optical eyepiece 3 provided at the other end.

According to embodiments of the present invention, the electronic eyepiece 10 and the eyepiece adapter 10A' further comprise a microdisplay 11, a beam combiner 12, a dichroic beam splitter 13 and an image sensor 14, wherein:
the microdisplay 11 is used to display an electronic image;
the beam combiner 12 receives the light from the objective lens 2 and the light from the microdisplay 11, and mixes them by transmitting and reflecting them respectively (and vice versa), so that the optical image formed by the objective lens 2 and the electronic image displayed on the microdisplay can spatially overlap and thus be observed together;
the dichroic beam splitter 13 receives the light mixed by the beam combiner 12, and selectively reflects and transmits it according to wavelength so that most of the visible light enters the first optical path to the eyepiece interface 100a and at least a part of the invisible light and a small portion/small part of the visible light of a predetermined wavelength enters the second optical path to the image sensor 14; and
the image sensor 14 receives the invisible light and visible light of a predetermined wavelength from the dichroic beam splitter 13 to acquire a detection image representing an optical image formed by the objective lens 2 and an electronic image displayed on the microdisplay 11.

The microdisplay 11, the beam combiner 12, the dichroic beam splitter 13, and the image sensor 14 in the electronic eyepiece 10 and the eyepiece adapter 10A' have the same structure, setup manner, and function as the microdisplay, the beam combiner, the dichroic beam splitter, and the image sensor in the telescope according to embodiments of the present invention as described above, and will not be repeated herein.

Preferably, as shown in FIG. 8, the electronic eyepiece 10 and the eyepiece adapter 10A' can further comprise a controller 15. The controller 15 calculates, based on the images detected by the image sensor 14, to obtain registration information about the registration of the optical image from the objective lens 2 and the electronic image from the microdisplay 11 after mixed by the beam combiner 12. For the structure of the electronic eyepiece 10 and the controller 15 in the eyepiece adapter 'OA', the setup manner of the controller 15, and the control method and processing performed, reference can be made to the controller in the telescope according to embodiments of the present invention, and will not be repeated herein.

In addition, preferably, the electronic eyepiece 10 and the eyepiece adapter 10A' can also include a relay lens 16 provided in the optical path between the beam combiner 12 and the optical eyepiece 3/eyepiece interface 10c, for relay-imaging the optical image formed by the objective lens and the electronic image displayed on the microdisplay 11 to the target image plan IM2 in the vicinity of the optical eyepiece 3/eyepiece interface 10c. In the example shown in FIG. 8, the relay lens 16 is provided between the beam combiner 12 and the dichroic beam splitter 13, but the present invention is not limited thereto. For example, similar to the structure shown in FIG. 5, the dichroic beam splitter 13 can be provided between two of the plurality of lenses included in the relay lens 16. This facilitates the realization of a more compact optical system.

The above description is only about preferable embodiments of the present application and explanation of applied technical principles. Those skilled in the art should understand that scope of the application involved in the present application is not limited to technical solutions comprising a specific combination of the above technical features, but further comprises other technical solutions comprising an arbitrary combination of the above technical features or their equivalent features without departing from the inventive concept, for example, a technical solution obtained by replacing the above features with (but not limited to) technical features of similar functions disclosed in the present application.

What is claimed is:

1. A telescope comprising a lens barrel and an objective lens housed within the lens barrel, the objective lens being used to form an optical image of an object observed with the telescope, the lens barrel being provided with an eyepiece interface, wherein the telescope further comprises:
   a microdisplay for displaying an electronic image;
   a beam combiner which receives light from the objective lens and light from the microdisplay and mixes them so that the optical image formed by the objective lens and the electronic image displayed on the microdisplay can spatially overlap and thus be observed together;
   a dichroic beam splitter which receives light mixed by the beam combiner, and selectively reflects and transmits it according to wavelength, allowing most of the visible light to enter a first optical path leading to the eyepiece interface and allowing at least part of invisible light and a small part of visible light of a predetermined wavelength to enter a second optical path; and
   an image sensor, provided in the second optical path, which receives the invisible light from the dichroic beam splitter and the visible light of the predetermined wavelength to obtain a detection image representing the optical image formed by the objective lens and the electronic image displayed on the microdisplay.

2. The telescope according to claim 1, further comprising a controller, wherein the controller calculates, based on the detection image, to obtain registration information about registration of the optical image and the electronic image.

3. The telescope according to claim 2, wherein the at least part of the invisible light comprises infrared light, the visible light of the predetermined wavelength is green light, and the dichroic beam splitter causes a large part of the green light to enter the first optical path and a small part of the green light to enter the second optical path.

4. The telescope according to claim 2, wherein the at least part of the invisible light comprises infrared light, the visible light of the predetermined wavelength is red light, and the dichroic beam splitter causes a large part of the red light to enter the first optical path and a small part of the red light to enter the second optical path.

5. The telescope according to claim 2, wherein the controller is configured to perform the following processing:
   turning off display of the microdisplay and acquiring a first detection image by the image sensor;
   turning on the display of the microdisplay to acquire a second detection image by the image sensor;
   performing image processing by subtracting the first detection image from the second detection image to obtain a difference image; and
   calculating and comparing the first detection image and the difference image to obtain the registration information about the registration of the optical image with the electronic image after mixed by the beam combiner.

6. The telescope according to claim 2, wherein the image sensor is a color CMOS image sensor and the controller is configured to perform the following processing:
   with display of the microdisplay turned on, acquiring the detection image by the color CMOS image sensor;
   performing image processing on the detection image to extract image content corresponding to infrared light as a first detection image based on color, and to extract image content corresponding to visible light of the predetermined wavelength as a second detection image;
   performing image processing by subtracting the first detection image from the second detection image to obtain a difference image; and
   calculating and comparing the first detection image and the difference image to obtain the registration information about the registration of the optical image with the electronic image after mixed by the beam combiner.

7. The telescope according to claim 5, wherein the controller is further configured to perform the following processing:
   solving for astronomical coordinates of orientation of the telescope based on the first detection image; and
   generating, based on the astronomical coordinates, the electronic image for combining with the optical image to provide an augmented or mixed reality display, and controlling the microdisplay to display the electronic image.

8. The telescope according to claim 5, wherein the controller corrects the electronic image displayed on the microdisplay in accordance with the registration information in such a way that the electronic image and the optical image formed by the objective lens are mutually in register.

9. An electronic eyepiece for a telescope, comprising a housing, the housing being provided with an objective-connecting end interface for connecting to a telescope barrel at one end and an optical eyepiece at the other end, wherein the electronic eyepiece further comprises:
- a microdisplay for displaying an electronic image;
- a beam combiner which receives light from an objective lens and light from the microdisplay and mixes them so that the optical image formed by the objective lens of the telescope and the electronic image displayed on the microdisplay can spatially overlap and thus be observed together;
- a dichroic beam splitter which receives light mixed by the beam combiner, and selectively reflects and transmits it according to wavelength, allowing most of visible light to enter a first optical path leading to the optical eyepiece and at least part of invisible light and a small part of the visible light of a predetermined wavelength to enter a second optical path; and
- an image sensor, provided in the second optical path, which receives the invisible light from the dichroic beam splitter and the visible light of the predetermined wavelength to obtain a detection image representing the optical image formed by the objective lens of the telescope and the electronic image displayed on the microdisplay.

10. The electronic eyepiece according to claim 9, further comprising a controller, wherein the controller calculates, based on the detection image, to obtain registration information about registration of the optical image and the electronic image.

11. The electronic eyepiece according to claim 10, wherein the at least part of the invisible light comprises infrared light, the visible light of the predetermined wavelength is green light, and the dichroic beam splitter causes a large part of the green light to enter the first optical path and a small part of the green light to enter the second optical path.

12. The electronic eyepiece according to claim 10, wherein the at least part of the invisible light comprises infrared light, the visible light of the predetermined wavelength is red light, and the dichroic beam splitter causes a large part of the red light to enter the first optical path and a small part of the red light to enter the second optical path.

13. The electronic eyepiece according to claim 10, wherein the controller is configured to perform the following processing:
- turning off display of the microdisplay and acquiring a first detection image by the image sensor;
- turning on the display of the microdisplay to acquire a second detection image by the image sensor;
- performing image processing by subtracting the first detection image from the second detection image to obtain a difference image; and
- calculating and comparing the first detection image and the difference image to obtain a registration information about the registration of the optical image with the electronic image after mixed by the beam combiner.

14. The electronic eyepiece according to claim 10, wherein the image sensor is a color CMOS image sensor and the controller is configured to perform the following processing:
- with display of the microdisplay turned on, acquiring the detection image by the color CMOS image sensor;
- performing image processing on the detection image to extract image content corresponding to infrared light as a first detection image based on color, and to extract image content corresponding to visible light of the predetermined wavelength as a second detection image;
- performing image processing by subtracting the first detection image from the second detection image to obtain a difference image; and
- calculating and comparing the first detection image and the difference image to obtain a registration information about the registration of the optical image with the electronic image after mixed by the beam combiner.

15. The electronic eyepiece according to claim 13, wherein the controller is further configured to perform the following processing:
- solving for astronomical coordinates of orientation of the telescope based on the first detection image; and
- generating, based on the astronomical coordinates, the electronic image for combining with the optical image to provide an augmented or mixed reality display, and controlling the microdisplay to display the electronic image.

16. An eyepiece adapter for a telescope, comprising a housing, the housing being provided with a objective-connecting interface for connecting to a telescope barrel at one end and an eyepiece interface for mounting an eyepiece at the other end, wherein the eyepiece adapter further comprises:
- a microdisplay for displaying an electronic image;
- a beam combiner which receives light from an objective lens and light from the microdisplay and mixes them so that the optical image formed by the objective lens of the telescope and the electronic image displayed on the microdisplay can spatially overlap and thus be observed together;
- a dichroic beam splitter which receives light mixed by the beam combiner, and selectively reflects and transmits it according to wavelength, allowing most of visible light to enter a first optical path leading to the eyepiece interface and at least part of invisible light and a small part of visible light of a predetermined wavelength to enter a second optical path; and
- an image sensor, provided in the second optical path, which receives the invisible light from the dichroic beam splitter and the visible light of the predetermined wavelength to obtain a detection image representing the optical image formed by the objective lens of the telescope and the electronic image displayed on the microdisplay.

17. The eyepiece adapter according to claim 16, further comprising a controller, wherein the controller calculates, based on the detection image, to obtain registration information about the registration of the optical image and the electronic image.

18. The eyepiece adapter according to claim 17, wherein the controller is configured to perform the following processing:
- turning off display of the microdisplay and acquiring a first detection image by the image sensor;
- turning on the display of the microdisplay to acquire a second detection image by the image sensor;
- performing image processing by subtracting the first detection image from the second detection image to obtain a difference image; and
- calculating and comparing the first detection image and the difference image to obtain a registration information about the registration of the optical image with the electronic image after mixed by the beam combiner.

19. The eyepiece adapter according to claim 17, wherein the image sensor is a color CMOS image sensor and the controller is configured to perform the following processing:

with display of the microdisplay turned on, acquiring the detection image by the color CMOS image sensor;

performing image processing on the detection image to extract image content corresponding to infrared light as a first detection image based on color, and to extract image content corresponding to visible light of the predetermined wavelength as a second detection image;

performing image processing by subtracting the first detection image from the second detection image to obtain a difference image; and calculating and comparing the first detection image and the difference image to obtain registration information about the registration of the optical image with the electronic image after mixed by the beam combiner.

20. The eyepiece adapter according to claim 18, wherein the controller is further configured to perform the following processing:

solving for astronomical coordinates of orientation of the telescope based on the first detection image; and generating, based on the astronomical coordinate, the electronic image for combining with the optical image to provide an augmented or mixed reality display, and controlling the microdisplay to display the electronic image.

* * * * *